Patented Nov. 15, 1932

1,887,772

UNITED STATES PATENT OFFICE

LAWRENCE F. MARTIN AND DONALD E. MacQUEEN, OF MIDLAND, MICHIGAN, ASSIGNORS TO THE DOW CHEMICAL COMPANY, OF MIDLAND, MICHIGAN, A CORPORATION OF MICHIGAN

PREPARATION OF BENZYL-ALKYL ANILINE

No Drawing.   Application filed April 1, 1929.   Serial No. 351,824.

The invention relates to methods for the preparation of benzyl-alkyl anilines whereby the formation of undesired by-products is restrained or prevented to a greater degree than has hitherto been feasible in existing commercial methods, resulting in the attainment of materially improved yields.

The benzyl-alkyl anilines, in particular the methyl and ethyl derivatives, are valuable intermediate products for the manufacture of certain classes of dyestuffs. These compounds were originally prepared simply by heating the respective mono-alkyl anilines with benzyl chloride, the reaction product being a rather complex mixture from which the desired benzyl-alkyl aniline was separated by fractional distillation. By such procedure no control was exercised over the reaction, large amounts of by-products were formed and yields of the desired product were most unsatisfactory.

A later improvement, which is practiced in present commercial methods, consists in carrying out the reaction in an aqueous medium containing sufficient alkali to neutralize the hydrochloric acid formed therein. In this way, it is stated, yields of as high as 60 per cent benzyl-alkyl aniline are obtained. A difficulty encountered when an aqueous alkaline solution is used arises from the hydrolysis of benzyl chloride to benzyl alcohol, the latter compound not entering further into the principal reaction and being recovered as such from the reaction product. This hydrolysis limits the capacity of the reacting materials to combine to an extent at all closely approaching quantitative proportions, and by transforming a considerable portion of the benzyl chloride to the undesired alcohol results in materially increased cost of the final product.

We have now found that an effective control of the reaction is secured whereby greatly improved yields of benzyl-alkyl anilines may be achieved when the reacting substances, viz., mono-alkyl aniline and benzyl chloride, are brought together directly without the intervention of an aqueous alkali or other medium, and in such way that the benzyl chloride is added gradually to the mono-alkyl aniline as the reaction proceeds and at about the same rate as combination occurs. To the accomplishment of the foregoing and related ends, the invention, then, consists of the steps hereinafter fully described and particularly pointed out in the claims, the following description setting forth in detail various procedure whereby the principle of the invention may be used.

While the present reaction takes place between a mono-alkyl-aniline and benzyl chloride or equivalent halide, in practice it is not necessary to employ a pure mono-alkyl-aniline for carrying out the process. It is sufficient to use a mixture of the mono- and corresponding di-alkyl anilines such as is commonly obtained in commercial processes for the preparation of such substituted anilines, the two derivatives in question having boiling points so close together that separation by the usual methods of fractional distillation is not feasible. The presence of the di-alkyl aniline in the reaction mixture is without effect upon the course of the reaction, the di-alkyl compound being recovered unchanged from the reaction product. In fact, as is well known, benzylating affords a practicable means for the separation of mono- and di-alkyl anilines.

The general procedure involved in our improved method consists in heating the mono-alkyl aniline, or mixture of mono- and di-alkyl anilines, approximately to the reaction temperature, and then gradually introducing the benzyl chloride in amount slightly less than corresponds to the mono-alkyl aniline present. The reaction may be carried out over a temperature range varying from 100° to 200° C., but preferably at about 140° to 150° C. At lower temperatures than those last mentioned the reaction proceeds more slowly, while at higher temperatures the advantage of a somewhat more rapid rate is counteracted by an increased formation of tarry decomposition products. For best results it is advisable to avoid any considerable fluctuations of temperature during the progress of the reaction. When reaction is complete sufficient alkali hydroxide or carbonate solution is added to neutralize the mixture which is then distilled directly or with steam to remove di-alkyl aniline and any unreacted mono-alkyl aniline. The residual oil is then distilled in vacuo to isolate the pure benzyl-alkyl aniline product, which is obtained in yield of 80 per cent or better.

The advantage of adding the benzyl chloride gradually appears to lie, at least in part, in introducing this compound at about the rate at which combination occurs, so that no excess of unreacted benzyl chloride is present in the mixture at any time during the progress of the reaction, thereby largely preventing the formation of impurities due to condensation or decomposition. The following detailed examples are here introduced by way of further illustration of our improved method.

*Example 1*

A technical mixture of mono- and di-methyl anilines was employed, containing 60 per cent mono-methyl and 40 per cent di-methyl aniline. 128.8 grams of this mixture, containing 77 grams mono-methyl aniline (0.715 mole) was heated to about 135° C. and 82.5 grams (0.65 mole) benzyl chloride was added with vigorous agitation at such rate that the temperature of the mixture was maintained at 145° to 150° C. by the heat developed in the reaction, approximately 1 hour being required for the operation. Heating was then continued by external means for 1½ hours longer. The reaction product was cooled to about 100° C., neutralized with a solution of sodium carbonate and distilled under reduced pressure to remove unreacted mono-methyl aniline and the di-methyl aniline contained in the original charge. The residual still contents were then distilled at 18 mm. pressure, a pure benzyl-methyl aniline fraction separating at 177° to 178° C. There was obtain 118.5 grams, or 92.5 per cent of the theoretical yield, of benzyl-methyl aniline.

*Example 2*

100 pounds of a mixture containing 51 per cent mono-ethyl aniline and 49 per cent di-ethyl aniline, i. e. 51 pounds (0.421 mole) of the former, was heated to 135°–140° C. in a steam jacketed reactor equipped with an agitator. Then 52.5 pounds (0.415 mole) of benzyl chloride was added gradually with vigorous agitation during 2½ hours, the temperature of the mixture being maintained between 145° and 150° C., after which heating was continued at the same temperature for 2 hours longer. The reaction product was neutralized and distilled with steam to separate mono- and di-ethyl anilines. From the residual still contents on distillation at 54 mm. pressure the fraction collected at 212° to 220° C. consisted of 70 pounds pure benzyl-ethyl aniline. Yield, 80 per cent.

In similar fashion homologous benzyl-alkyl anilines may be prepared by reacting between the corresponding mono-alkyl aniline and a benzyl-halide. The bromide naturally may be equally well employed for the purpose as the chloride, although from the standpoint of cost the chloride will usually be preferred. The hydrochloric, or hydrobromic acid, formed in the reaction is held in combination by the basic amines present as the hydrochloride or hydrobromide salts of said amines. Treatment of the reaction product with alkali carbonate or hydroxide liberates the free amines, which are then separated by distillation as hereinbefore described. By carrying out the principal reaction in the absence of alkali, hydrolysis of the benzyl halide to benzyl alcohol is virtually avoided.

Other modes of applying the principle of our invention may be employed instead of those explained, change being made as regards the method herein disclosed, provided the steps stated by any of the following claims or the equivalent of such stated steps be employed.

We therefore particularly point out and distinctly claim as our invention:—

1. In a method of increasing the yield of a benzyl-alkyl aniline obtained by reacting a benzyl-halide with an N-alkyl aniline, the step which consists in gradually adding the former reactant to approximately its chemical equivalent of the latter as the reaction proceeds and at about the same rate as reaction occurs.

2. In a method of increasing the yield of a benzyl-alkyl aniline obtained by reacting between a benzyl-halide and an N-alkyl aniline, the step which consists in gradually adding the former reactant to more than its chemical equivalent of the latter as the reaction proceeds and at about the same rate as the reaction occurs.

3. In a method of increasing the yield of benzyl-ethyl aniline obtained by reacting between benzyl chloride and N-ethyl aniline, the step which consists in gradually adding the former reactant to approximately its chemical equivalent of the latter as the reaction proceeds and at about the same rate as reaction occurs, while maintaining the reaction temperature between about 100° and 200° C.

4. In a method of increasing the yield of benzyl-ethyl aniline obtained by reacting between benzyl chloride and N-ethyl aniline, the steps which consist in heating the latter to approximately the reaction temperature and then adding approximately its chemical equivalent of benzyl chloride thereto as the reaction proceeds and at about the same rate as reaction occurs, while maintaining the reaction temperature between about 140° and about 150° C., and while agitating the reaction mixture.

5. The method of increasing the yield of a benzyl-alkyl-aniline obtained by reacting benzyl chloride with an N-alkyl-aniline which comprises slowly adding benzyl chloride to slightly more than its molecular equivalent of an N-alkyl-aniline while maintaining the latter at a temperature between about 100° and about 200° C.

Signed by us this 28 day of March, 1929.

LAWRENCE F. MARTIN.
DONALD E. MacQUEEN.